United States Patent [19]

Aviram et al.

[11] 3,833,894

[45] Sept. 3, 1974

[54] ORGANIC MEMORY DEVICE

[75] Inventors: Arieh Aviram, Yorktown Heights; Philip E. Seiden, Briarcliff Manor, both of N.Y.

[73] Assignee: International Business Machines Corporation, Armonk, N.Y.

[22] Filed: June 20, 1973

[21] Appl. No.: 371,788

Related U.S. Application Data

[63] Continuation-in-part of Ser. No. 258,639, June 1, 1972, abandoned.

[52] U.S. Cl. .. 340/173 R, 340/173 NI, 317/235 AF

[51] Int. Cl. .......... G11c 13/00

[58] Field of Search .......... 340/173 R, 173 NI; 317/235 AF

[56] References Cited

UNITED STATES PATENTS 3,119,099 2/1960 Burnat .......... 340/173 NI

*Primary Examiner*—Terrell W. Fears
*Attorney, Agent, or Firm*—Isidore Match

[57] ABSTRACT

The organic memory device described herein comprises an organic compound having a molecular structure which includes a mixed valence double well of an organic or organometallic redox couple separated by a $\sigma$, i.e., a non-conjugated bridge, the two components of the redox couple being the respective end groups of the structure. The remainder of the molecule is chosen to effect electro-neutrality. The total molecular structure is such that in a film of the compound laid down on a substrate surface, the molecules assume dispositions such that their long axes are substantially perpendicular to the plane of the surface. Examples of the redox couple are: ferrocene, ferrocenium ⊕ ; hydroquinone, quinone, tropylidine, tropylium⊕; and dihydropyridine, pyridinium⊕. This type of molecular structure exhibits a potential energy versus distance plot, wherein the term "distance" signifies the length of the molecule, i.e., from end group to end group of the redox couple, which defines first and second minimum potentials or wells separated by a maximum potential, the distance between the wells substantially corresponding to the length of the molecule. In operation, upon the application of a potential across a film of the compound, electrons are caused to tunnel from one minimum to the other to thereby define a given state.

18 Claims, 11 Drawing Figures

ORGANIC MEMORY DEVICE

CROSS REFERENCE TO RELATED APPLICATION

This application is a continuation-in-part of copending patent application Ser. No. 258,639, filed on June 1, 1972, and now abandoned.

BACKGROUND OF THE INVENTION

This invention relates to storage devices. More particularly, it relates a novel storage device which comprises an organic compound wherein electrons can be caused to tunnel from a first to a second potential well to thereby define a given storage state.

To enable the use of organic materials as the storage element in memory type storage devices, it is necessary to provide organic compounds wherein the location of an electron therein can be changed by means of appropriate controls such as, for example, electric fields, optical beams, heat, etc.

It is, accordingly, an important object of this invention to provide an organic memory device comprising an organic material wherein the location of an electron therein can be changed by the application of an appropriate energy source.

It is another object of this invention to provide an organic memory device comprising an organic material which is characterized by a potential energy versus distance plot which includes minimum values separated by a maximum value and wherein, upon the application of a potential thereto, electrons are caused to tunnel from one of the minimums to the other of the minimums.

PRIOR ART

U.S. Pat. No. 3,119,099 to W. M. Biernat, filed Feb. 8, 1960 discloses a molecular storage unit utilizing organic compounds which undergo molecular rearrangement under the combined stress provided by an alternating current field and a magnetic field. In operation, when a combined electrical and magnetic field is applied, an atom or group of atoms forming a branch chain shifts its position in space with respect to some reference axis of the molecular. The atom or group of atoms will move as a unit through an angle of rotation depending on an adjacent electrostatic atomic field. The electrostatic atomic bonds are not broken although the interatomic distances may change somewhat. The rotated atoms constitute a particular storage state.

SUMMARY OF THE INVENTION

In accordance with the invention, there is provided a memory device which comprises first and second conductor means orthogonally disposed relative to each other. Sandwiched between the two conductor means is an organic compound which includes a mixed valence double wall of a redox couple separated by a $\sigma$, i.e., a non-conjugated bridge, the two components of the redox couple being the respective end groups of such molecular structure. The remainder of the molecular structure is chosen to be of a nature to effect electro-neutrality. The total molecular structure is of a nature such that, in a film of the organic compound laid down on a substrate surface, the molecules assume dispositions whereby their respective long axes are substantially perpendicular to the plane of the substrate surface. The molecular structure of the organic compound is characterized by a potential energy versus distance plot, wherein the term distance signifies substantially the length of the molecule, i.e., from end group to end group of the redox couple, which defines first and second minimum potentials or wells separated by a maximum potential. When a potential of a given polarity is applied across a selected pair of orthogonally disposed conductors, electrons situated in the first of the minimum or wells according to the above-mentioned potential energy versus distance plot are caused to tunnel into the second of the minimums or wells to thereby establish a given storage state, i.e., to enable the storage of information. The stored information can be erased by reversing the polarity of the applied potential, the tunneling being effected by the applied potential. A detector may suitably be employed to register the current pulse which results from the tunneling of the electrons.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
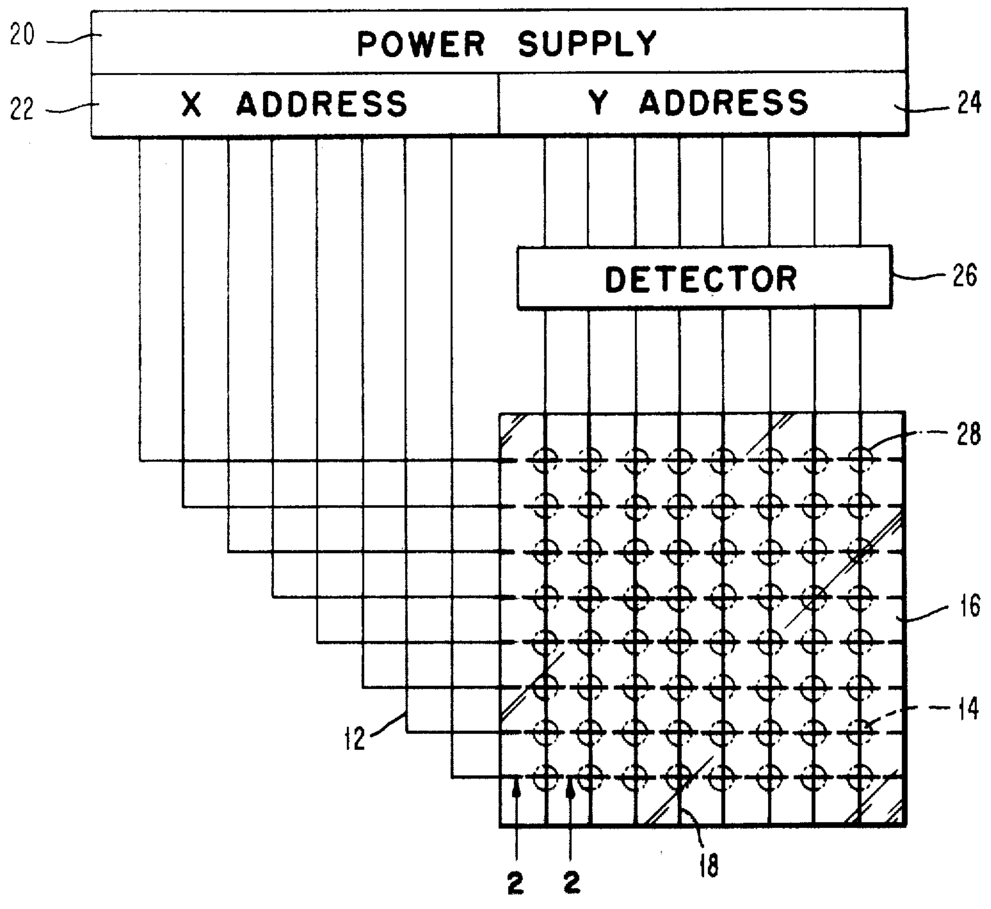
FIG. 1 is a schematic view of a memory matrix built in accordance with this invention.
Figure 2:
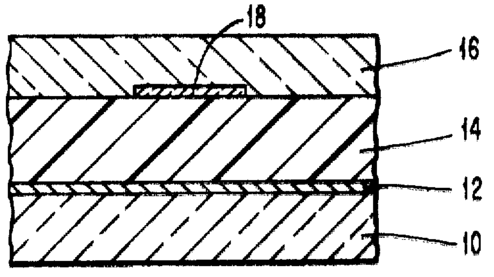
FIG. 2 is a cross-sectional view of the memory matrix of FIG. 1.

Referring to FIGS. 1 and 2, there is shown a memory matrix comprising a transparent substrate 10 made of glass, quartz, mica, plastic or other suitable substance having electrical insulating properties. One or more base metal conductors 12 are deposited on substrate 10. A film 14 of an organic material is coated onto substrate 10. The film 14 of organic material is oriented such that its longitudinal axis is perpendicular to substrate 10. This orientation can be obtained by practicing the methods described in the references to H. Kuhn et al., Angewandte Chemie, Vol. 10, p. 620 (1971) and E. W. Thylstrup et al., J. Phys. Chem., Vol. 79, p. 3868 (1970). A fourth layer 18 having one or more metal conductors is deposited thereon in an arrangement orthogonal to conductors 12. A further protective layer 16, for example, SiO, may be deposited if desired. Attached to conductors 12 and 18 is power supply 20 in conjunction with *x* and *y* address means 22 and 24, respectively.

The organic materials used in this invention are chemically engineered such that the location of an electron in a molecule can be controlled and can be changed by electric fields, optical beams, heat, etc. Examples of such engineered materials are depicted immediately hereinbelow.

A

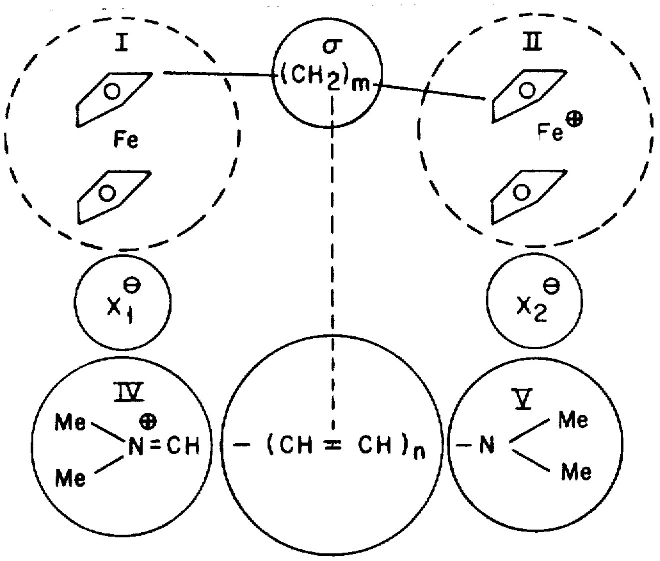

B

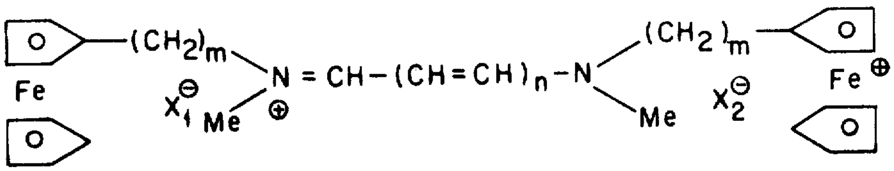

C

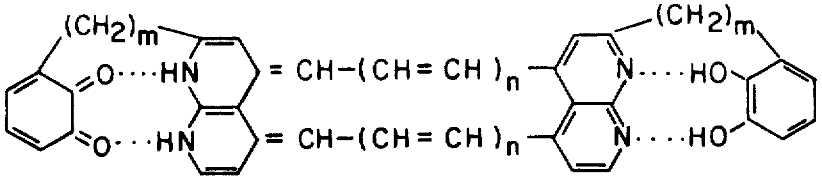

D

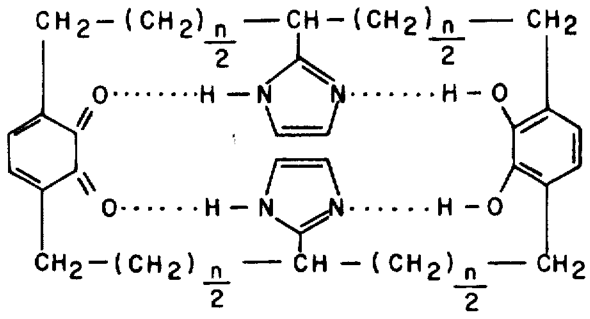

E
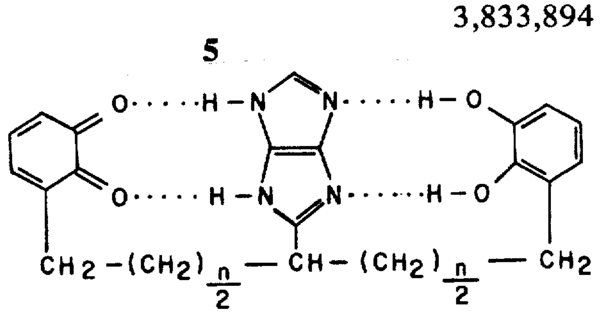
F
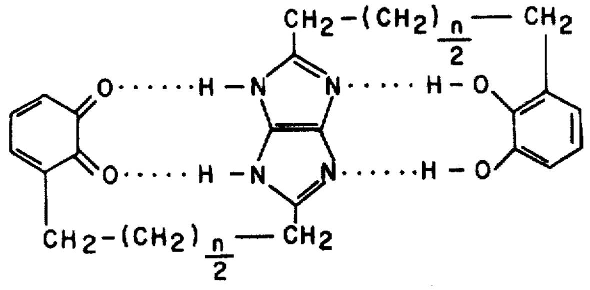
G
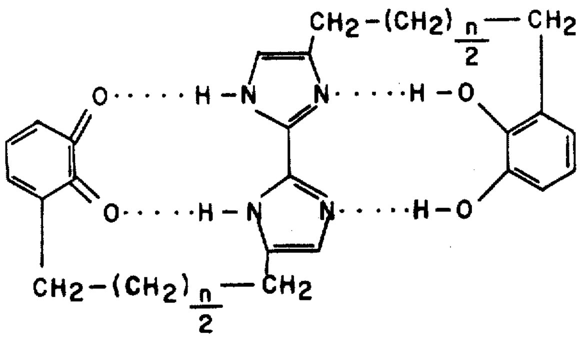
H
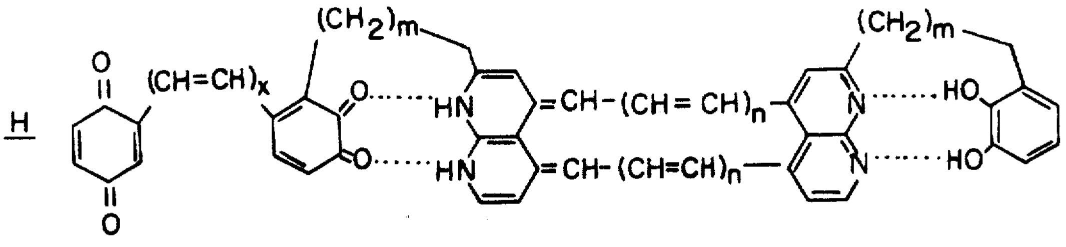
I
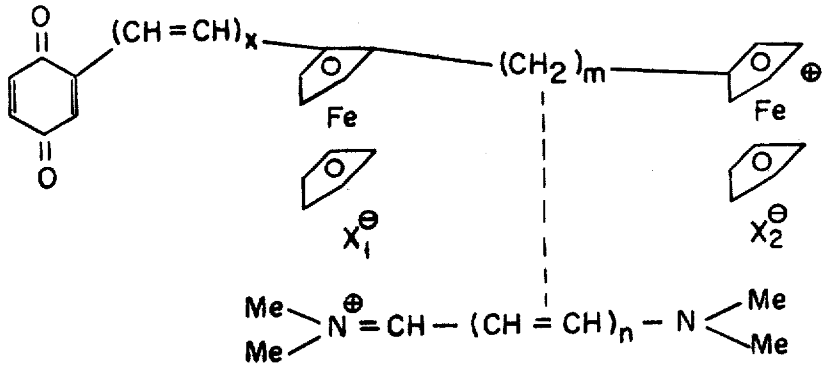

J
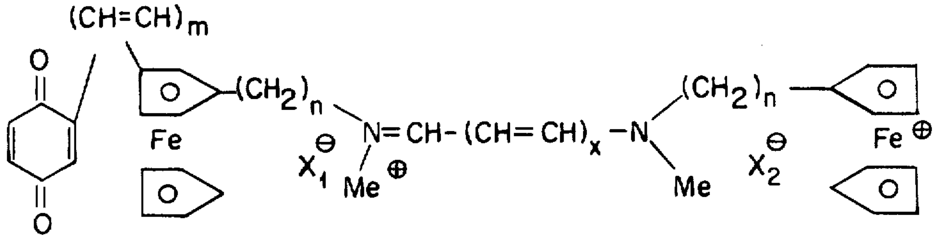

K
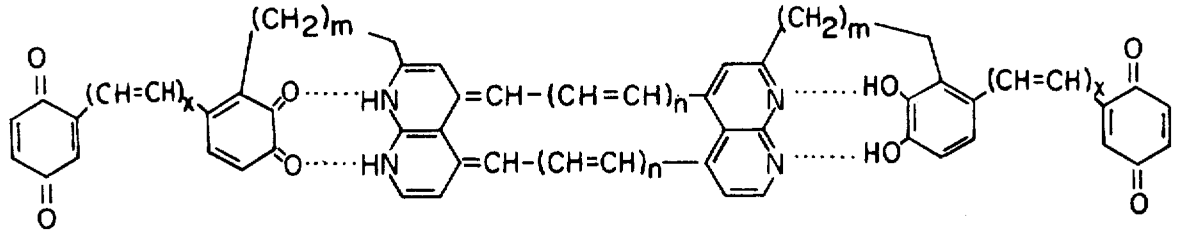

L
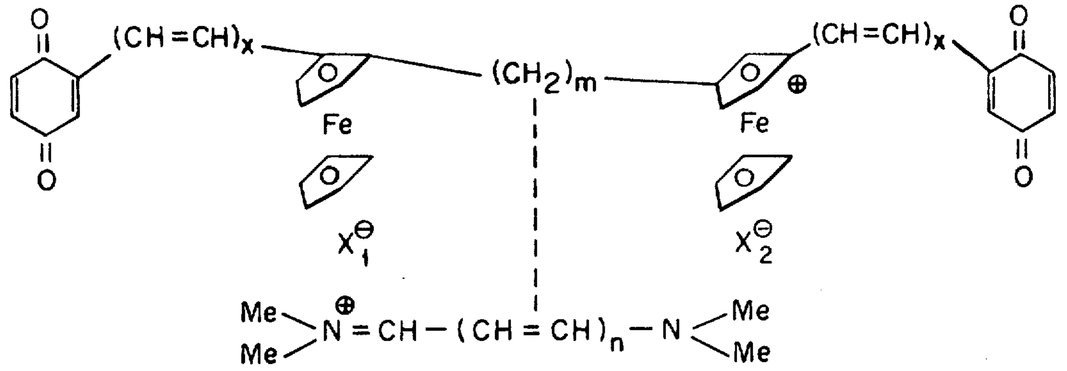

M
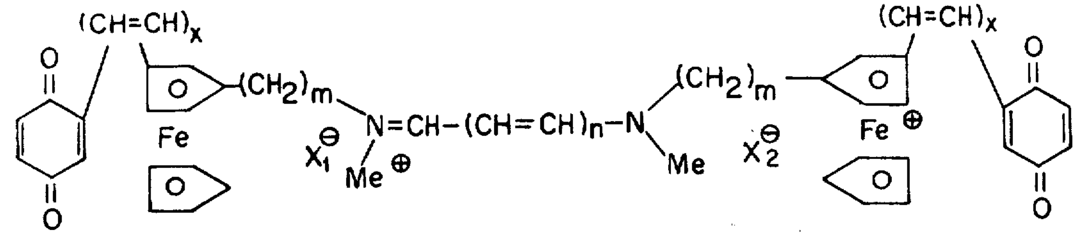

The molecules of these materials respectively consist of a mixed valence double well of a redox couple such as:

Ferrocene, Ferrocenium⊕;
Hydroquinone, Quinone;
Tropylidine, Tropylium⊕;
Dihydropyridine, Pyridinium⊕.

The two elements of the redox couple are separated by a σ bridge to avoid conjugation as diagrammatically shown in structural formula A hereinabove.

It is to be noted that the two systems are interchangeable, i.e., portion I of the compound can assume the configuration of portion II, and portion II can assume the configuration of portion I. The remainder of the molecule is constructed to enable the maintaining of electro-neutrality during the interchange of configuration. In compound A, $X_2^{\ominus}$ is associated with the ferrocenium component and $X_1^{\ominus}$ is associated with nitrogen, i.e., IV.

When molecular portions I and II interchange configurations, portions IV and V, correspondingly interchange. Also, $X_2^{\ominus}$ becomes associated with N in portion V while $X_1^{\ominus}$ becomes associated with the new ferrocenium component formed in portion I. $X_1^{\ominus}$ and $X_2^{\ominus}$ are suitably simple anions such as $I^{\ominus}$, $Br^{\ominus}$, $Cl^{\ominus}$, $F^{\ominus}$, $AcO^{\ominus}$, $BF_4^{\ominus}$, $TCNQ^{\ominus}$. In all of compounds A to G, the integer *m* may have a value of from 2 to 50 and the integer *n* may have a value of from 1 to 25 in those compounds where both *m* and *n* are present. In those compounds where only *n* in present, *n* has a value of from 2 to 30. Also, in those compounds wherein the integer *x* occurs, *x* has a value of from 1 to 3.

In compounds such as exemplified by compound C hereinabove, the charge is neutralized by the protons on the hydroquinone group. These protons also form hydrogen bonds to the nitrogen on the 1,8-Naphthyridine as schematically depicted by the dotted lines ( . . . ). The other two hydrogens are bonded to the nitrogens of the dihydronaphthyridine and hydrogen-bonded to the oxygens of the quinone. When the hydroquinones and quinones interchange configurations, the function of the hydrogens is also correspondingly interchanged (i.e., tautomerism occurs which is further depicted hereinbelow).

Figure 3A:
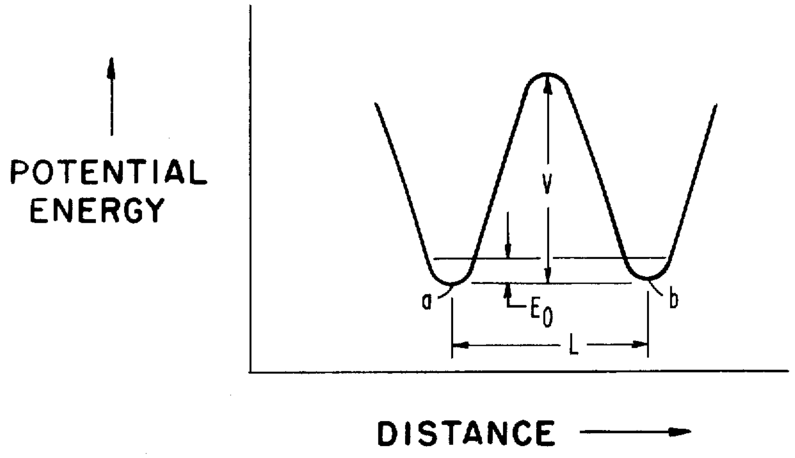
FIG. 3A is a potential energy vs. distance plot of an organic molecule used in this invention.

Such compounds exhibit a potential energy vs. distance plot such as shown in FIG. 3A. The plot illustrates the double wells *a* and *b* believed to be characteristic of the $\pi$ bonding system of the compounds used in this invention. It should be noted that substituents on the benzene rings are symmetrical. This symmetry accounts for the identical curves of the double wells *a* and *b*. The ground state energy of the electrons in the well is $E_0$, while the depth of the well is V. Therefore, the barrier is V-$E_0$.

If C is considered, electrons are caused to tunnel from well to well by some exciting energy. For example, if the electrons are present in well *a* and a voltage of sufficient energy is applied across conductors 12 and 18 (FIGS. 1 and 2), the electrons will tunnel into well *b*. Since the barrier potential is now V-$E_0$-$V_s$, where $V_s$ is the part of the applied potential energy across length L, and may be made large enough to cause the electrons to tunnel. They will not tunnel back because in the reverse direction the barrier is $V$-$E_0$+$V_s$. Such tunneling of the electrons causes a tautomeric change in structure C, resulting in the tautomer of structure:

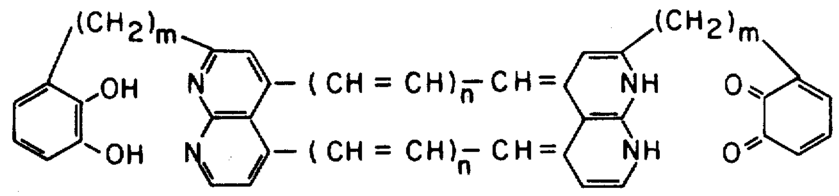

Figure 3B:
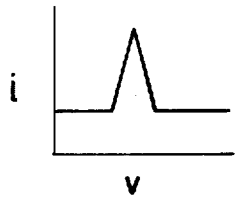
FIGS. 3B, C and D are I–V plots representing the write, read and reverse modes of the memory of this invention.
Figure 3C:
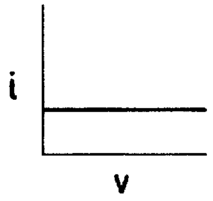
Figure 3D:
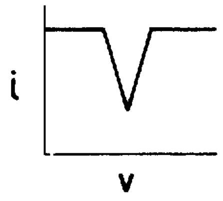

The tunneling causes a current pulse to occur similar to the current-voltage plot in FIG. 3B. This pulse is detected by detector 26 of FIG. 1. The detector can be any means for current detection, e.g., an ammeter, current pulse detection circuitry and the like. The above condition, i.e., where electrons are caused to tunnel from well *a* to well *b*, may be considered the writing mode. To determine in which well the electrons are located, or read mode, a voltage of the same polarity as before is applied. A current-voltage plot as shown in FIG. 3C is obtained if electrons are in well *b*. If they were in well *a*, a current-voltage plot as shown in FIG. 3B would be seen. The erase mode is accomplished by the application of a voltage having polarity opposite to that used in the write mode. A current-voltage plot such as that in FIG. 3D is obtained.

The compound C shown above can be prepared according to the following synthetic scheme;

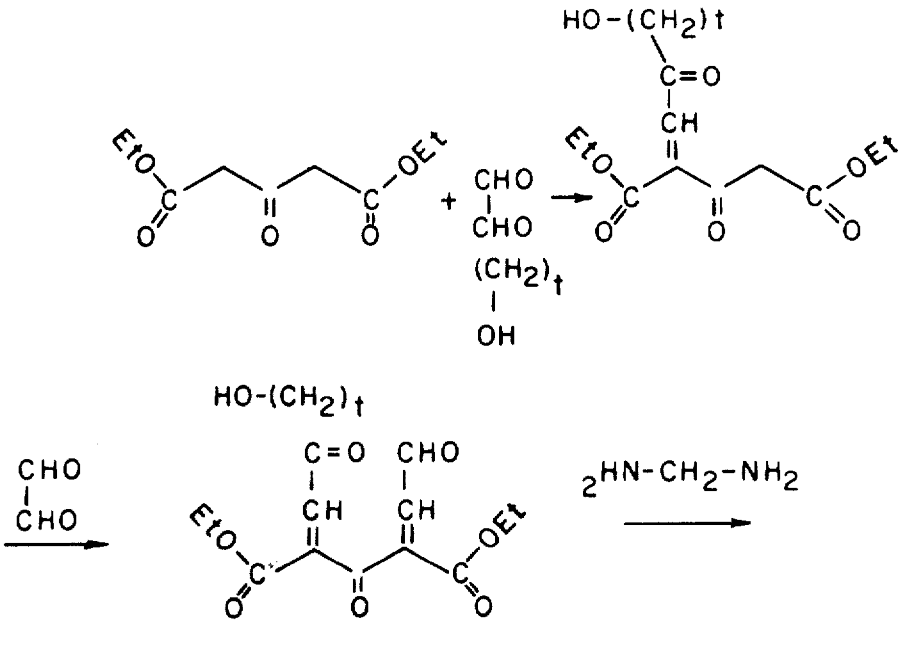

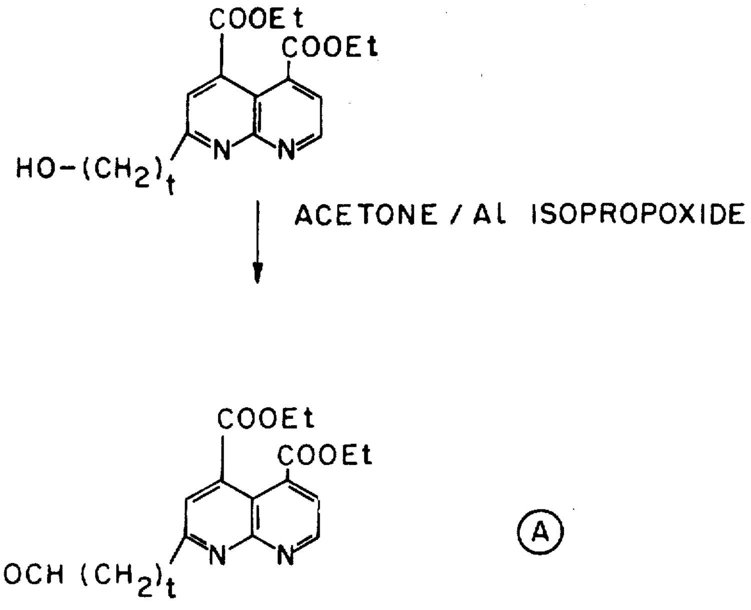
COOEt
COOEt
N
N
HO-(CH2)t
ACETONE / Al ISOPROPOXIDE
COOEt
COOEt
N
N
OCH (CH2)t
A
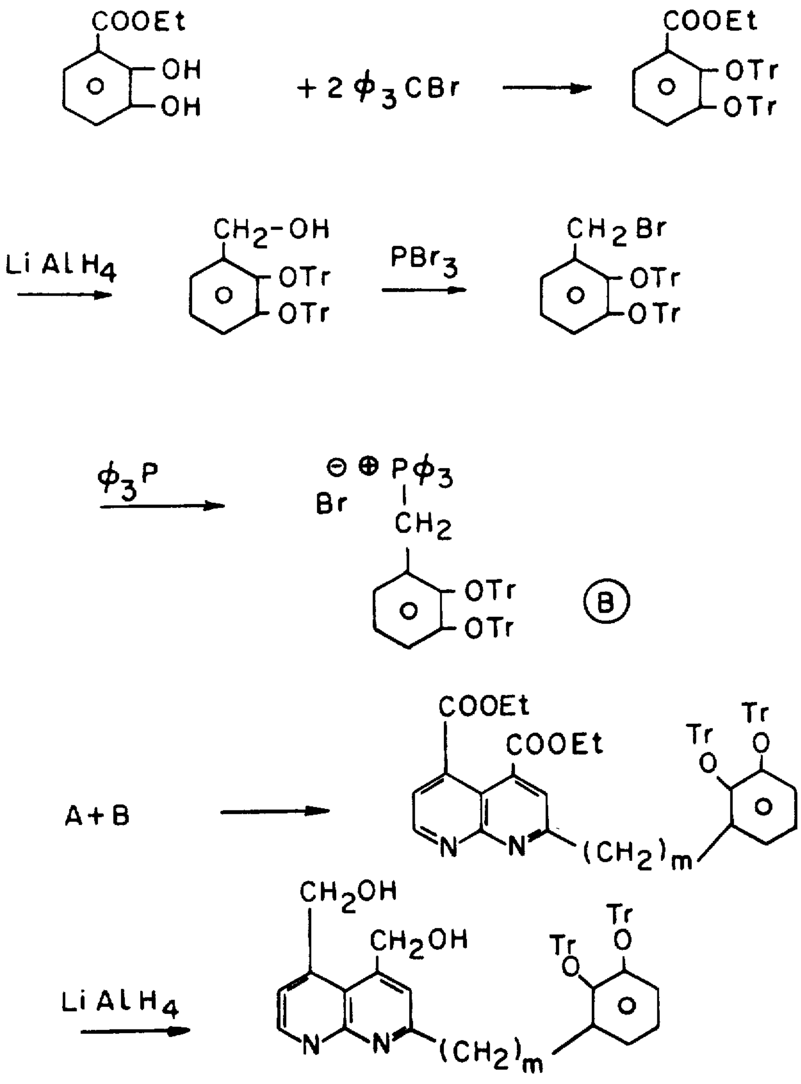
COOEt
OH
OH
+ 2 φ3CBr
COOEt
OTr
OTr
LiAlH4
CH2-OH
OTr
OTr
PBr3
CH2Br
OTr
OTr
φ3P
⊖ ⊕ Pφ3
Br
CH2
OTr
OTr
B
A+B
COOEt
COOEt
Tr
Tr
O
O
N
N
(CH2)m
CH2OH
CH2OH
Tr
Tr
O
O
LiAlH4
N
N
(CH2)m

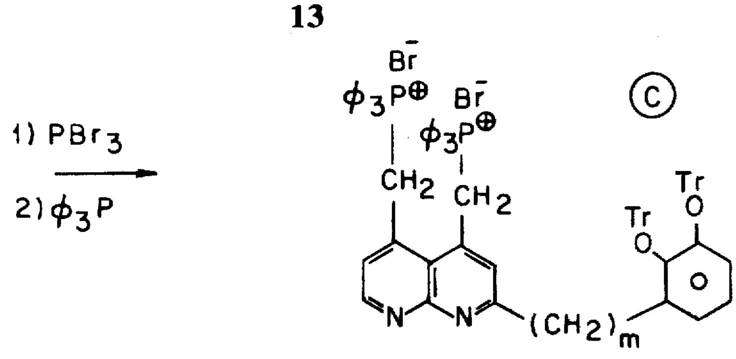

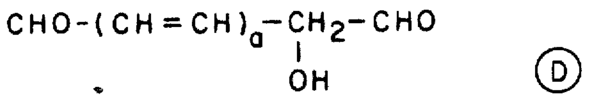

C + D

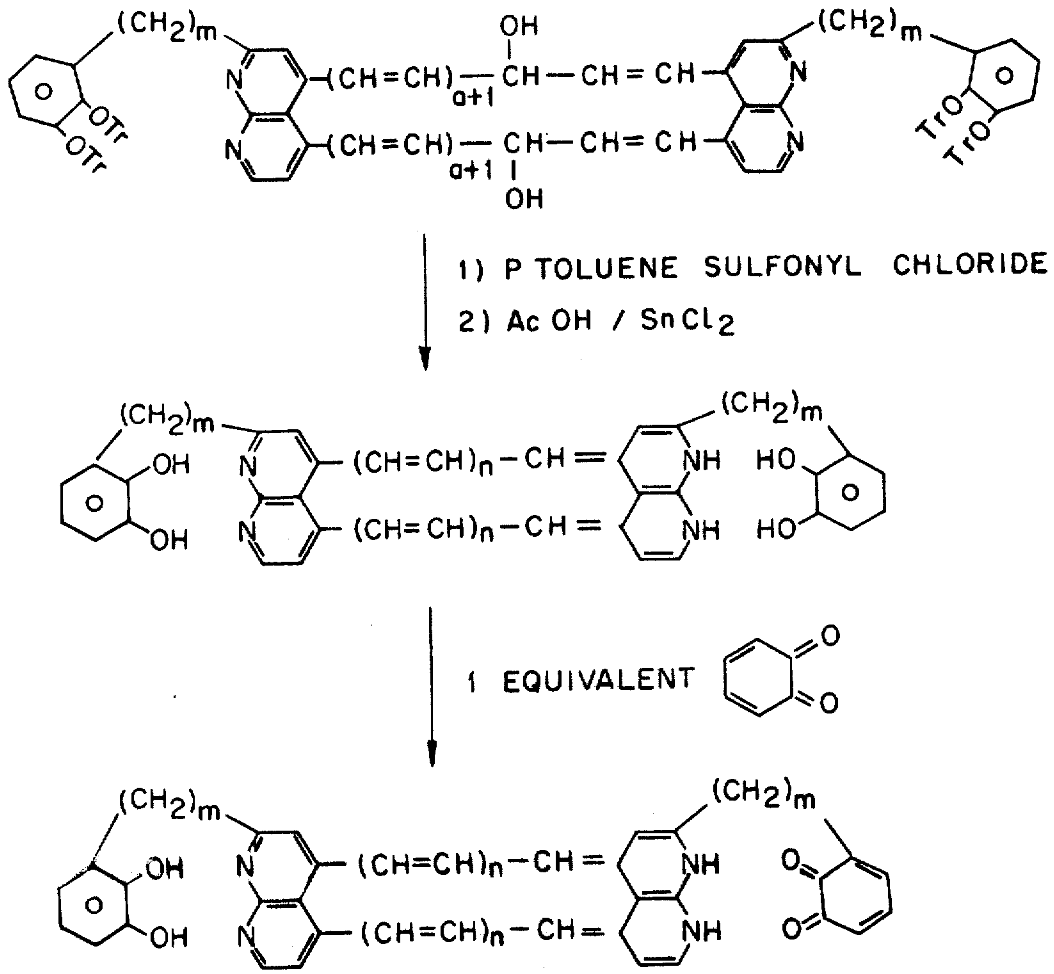

Referring again to FIG. 1, the operation of the memory matrix shown therein can be explained by the abovementioned principles. When a voltage is applied across select $x$ and $y$ conductors 12 and 18, as determined by the $x$ and $y$ addressers 22 and 24, information can be written into or erased from a select site or sites, i.e., at the interstices of the $x$ and $y$ conductors represented by the small circles 28 of FIG. 1. The mode, write or erase, is detected on detector 26, by current pulse such as that shown in FIGS. 3B–D.

Figure 4:
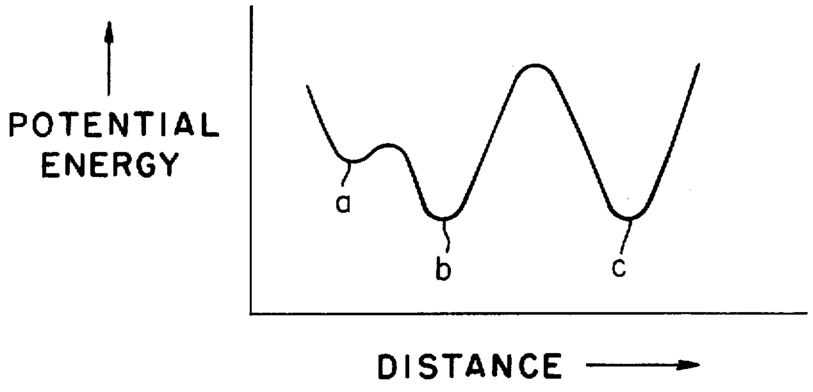
FIG. 4 is a potential energy vs. distance plot of other organic compounds employed according to this invention.

In another preferred embodiment of the invention the memory medium is composed of an organic compound which exhibits a potential energy vs. distance plot as shown in FIG. 4. The compound can have one of the following structures:

H
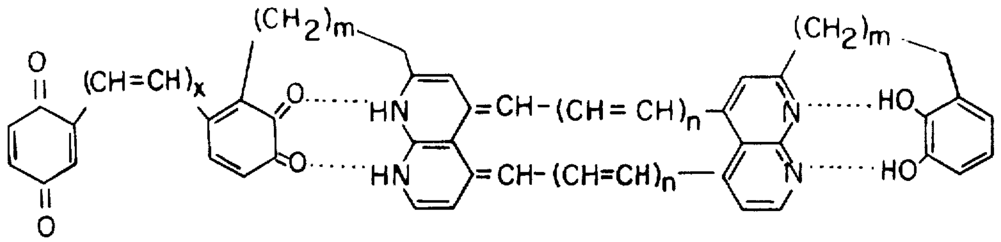

I
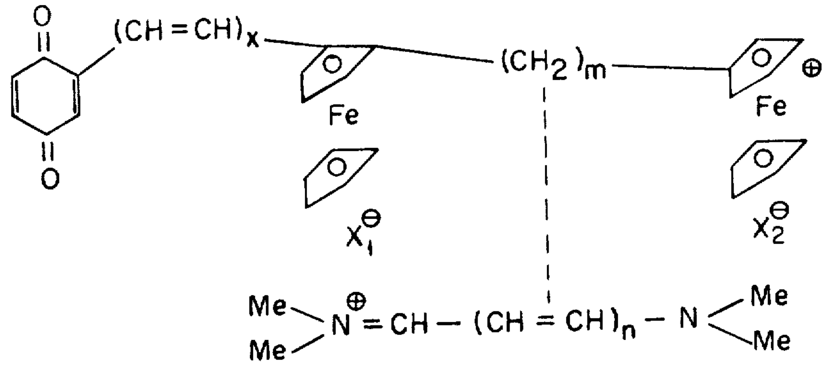

J
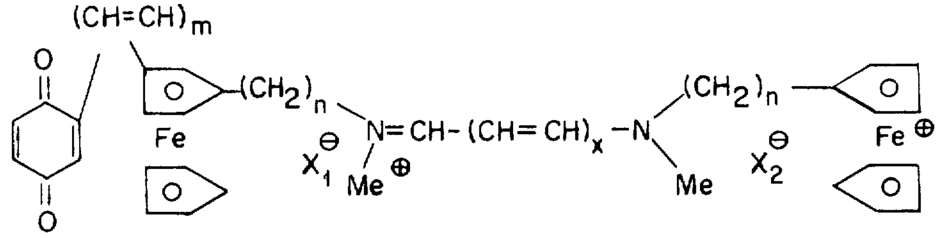

Memory devices using this compound have non-destructive readout. That is, they may be interrogated by a smaller voltage, the response to which will determine the memory state but will not change it. Therefore, the memory state can be read out without destroying it. For example, a voltage can be used to write by causing electrons to tunnel from side *a–b* to side *c*. A smaller voltage can be used to read. The potential between *a* and *b* is such that electrons can decay to *b* at the temperature of operation. If a smaller read voltage is applied in such a direction that electrons move in the direction $c \rightarrow a$, then if the electrons were in *c*, they would not move giving no signal pulse. If they were at *b*, they would move to *a* giving a signal pulse. After the removal of the small voltage, electrons in *a* would return to *b*.

Figure 6:
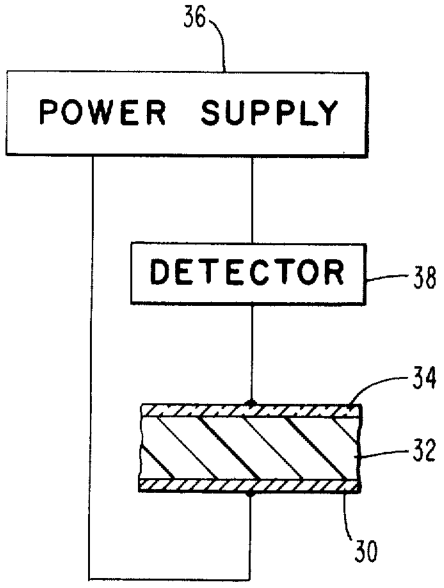
FIG. 6 is a partly cross-sectional view of another embodiment of the invention.

In FIG. 6 there is shown a memory device comprising a conducting plate 30, a film 32 of an organic compound having the structures shown above, and a transparent conductor 34. Power source 36 together with detector 38 are connected to conducting plate 30 and conductor 34. As in the device shown in FIGS. 1 and 2, the organic film 32 is deposited such that the polar axes of the molecules are oriented perpendicular to conductors 30 and 34.

Figure 5:
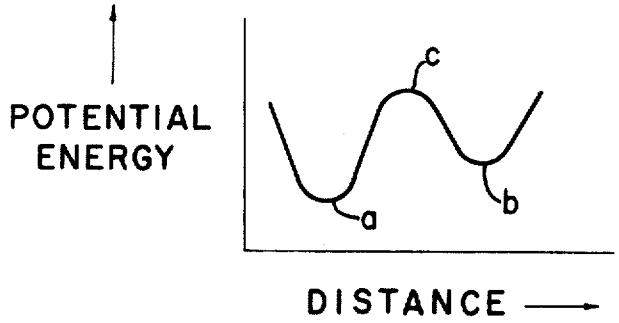
FIG. 5 illustrates the tilting of the potential energy vs. distance plot upon the application of an external voltage.

In operation, an external voltage is applied from power source 36 across conductors 30 and 34. The result of applying such external voltage is that the potential energy vs. distance plot of FIG. 3A is tilted as in FIG. 5. It should be noted that the applied voltage is below the threshold voltage necessary to cause the electrons to tunnel from one well into the other. If the electrons are in *b* they can be raised to the maximum potential *c* by means of laser radiation. This switching or transferring of electrons is caused either by heating or direct optical absorption by the film 32. The electrons will then preferentially decay into a lower state or well *a*. The electron transfer is detected by a current pulse in the voltage lines. In some materials the transferred electrons can be detected by the color of a spot produced. More precisely, the electron shift is detected by the relative absorption of a given wavelength of light between the two states. If the electrons were originally in well *a*, no current pulse would be detected. The device can be switched in the opposite direction by simply reversing the polarity of the biasing, i.e., the applied voltage.

This device can be made non-destructuve by providing an organic compound which exhibits a potential energy vs. distance plot similar to that shown in FIG. 4. Such a compound has both a stable transition and a metastable transition, the structure of which is shown as follows:

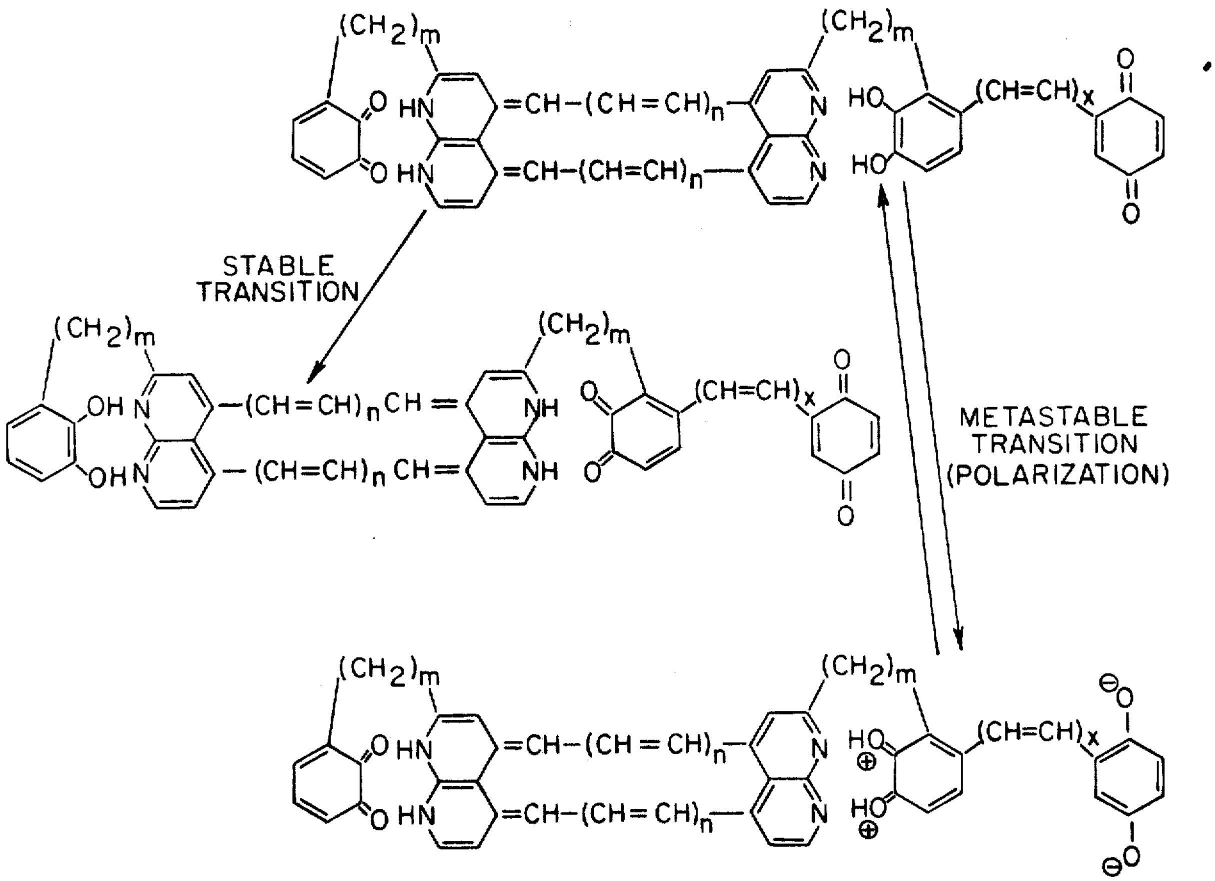

When the above compound is used, a low energy laser beam can be used to deflect the electrons over the potential between *a* and *b* and not *b* and *c* This can be used for detection in the same way as the original writing scheme. If the electrons are in *c*, nothing happens but if they are in *a* or *b* a current pulse results. In order to get a signal to determine whether the electrons are in *a* or in *b* the voltage on the device can be reversed during illumination so that it makes no difference in which of the two wells the electrons were in, a pulse will be generated.

When organic compounds H, I and J are employed to provide the potential energy vs. distance plot depicted in FIG. 4, there can be detected either the presence or absence of a current, i.e., there is provided a single polarity current pulse. If it is desired to provide a bipolar current pulse, then there can be utilized the following organic compounds according to the invention.

K

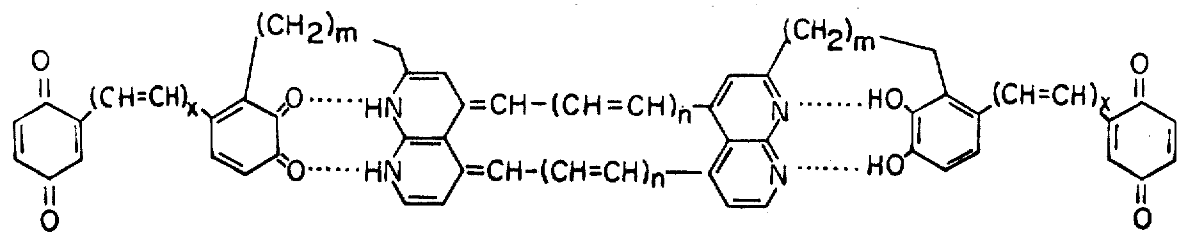

L

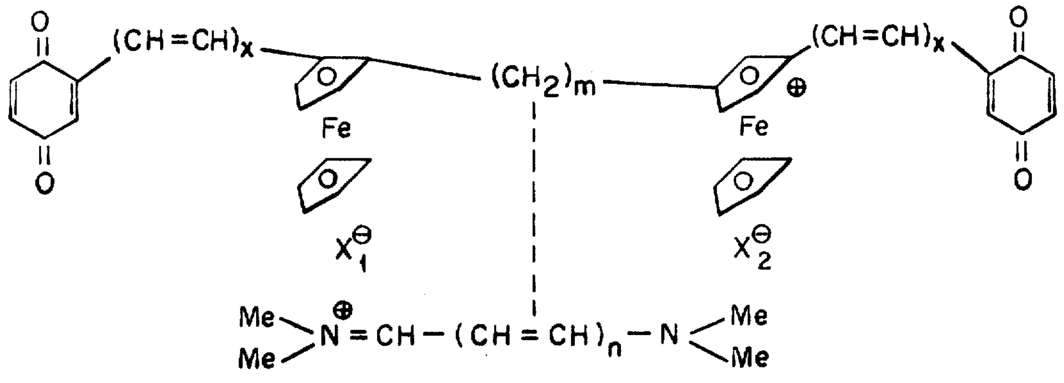

M 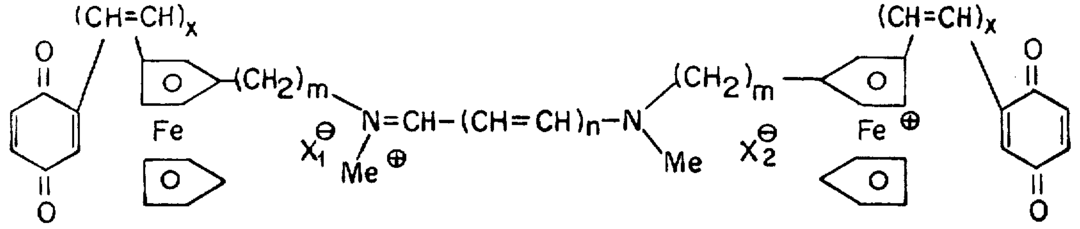

Figure 8:
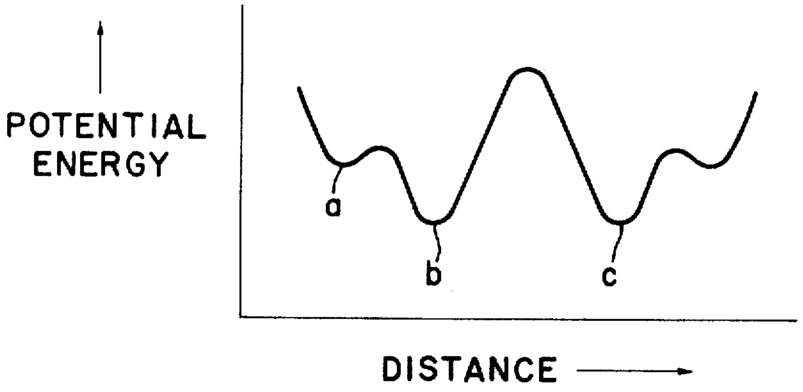
FIG. 8 is a potential energy vs. distance plot of still other organic compounds according to the invention.

These compounds are characterized by a potential energy vs. distance plot as shown in FIG. 8.

In the plot shown in FIG. 8, a current pulse of one polarity occurs if electrons are in *a* or *b* and a current pulse of the opposite polarity occurs if electrons are in *c* or *d* when the compounds are employed in the same manner as described in connection with the use of compounds H, I and J.

Figure 7:
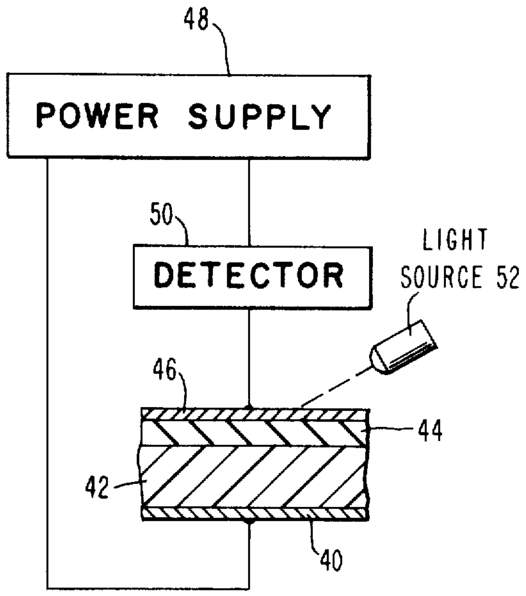
FIG. 7 is a partly cross-sectional view of yet another embodiment of the invention.

In FIG. 7 there is shown another embodiment of the invention. The device shown therein comprises a conductor 40 having disposed thereon a film 42 of an organic compound having a potential energy vs. distance plot as shown in FIG. 3A or 4. The film 42 is oriented such that the longitudinal axis of the compound is perpendicular to the axis of the conductor 40. Disposed upon the organic film 42 is a photoconductor 44 which in turn has disposed thereon a transparent conductor 46. Attendant to the device are a power supply 48 to supply a voltage to said conductors 40 and 46, and a detector 50 to detect current pulses. In operation, the device shown in FIG. 7 operates, in principle, similarly to that shown in FIG. 1. It differs in that a light source 52 is used to decrease the resistance of the photoconductor layer 44, such that an applied voltage will cause electron tunneling, i.e., switching in the organic layer 42. Normally in this device, when a voltage is applied across the pair of conductors 40 and 44, it is insufficient to cause switching of the organic layer 42, because of the resistance of the photoconductor layer 44 is much greater than that of the organic layer, so that most of the voltage will be across layer 44. In the presence of light of sufficient intensity, the resistance of the photoconductor layer 44 is decreased to a value much less than that of the organic layer, so that the voltage is now mostly across the organic layer 42. Thus switching is effected in the areas or spots illuminated by the light source 52.

The light source 52 used in this device can be selected from normal actinic radiation sources and from solid state lasers. The wavelength and the intensity of the source will, of course, be dependent upon the photoconductor material used.

The photoconductor material used can be selected from any known number of such materials which are commercially available. For example, Se, CdS, CdSe, PbS, and PbSe can be used. A prime consideration in the selection of a photoconductor material is that its resistive properties be such that its resistance is higher than that of the organic layer in the absence of light, and conversely, lower than that of the organic layer in the presence of light.

For example, it is known that photoconductors are available with dark resistivities between 1 and $10^{15}$ Ω cm and that it is possible to illuminate a spot on the photoconductor and lower its resistivity by a factor of $10^3 - 10^4$ (Photoconductivity in the Elements by T.S. Moss, Academic Press, New York, 1952, and Photoconductivity in Solids by R. H. Bube, John Wiley and Sons, New York, 1960). The resistance of a $1\mu \times 1\mu$ spot (possible bit size) 1,000 A layer would be between $10^5 \geq R_p \geq 10^{20}\Omega$. For some of the most resistive molecular layers (e.g., the straight chain aliphatic acids) the resistivity is $\leq 10^{16}\ \Omega$ cm (B. Mann and H. Kuhn, J. Appl. Phys., Vol. 42, p. 4398, 1971) so that, for example, for a 70 A layer $1\mu \times 1\mu$ spot R $\leq 7 \times 10^{17}\ \Omega$, so it should be possible for any organic layer to find a proper photoconductive where the dark resistance is at least 10 times the organic resistance and the light resistance is at most one-tenth of the organic resistance.

The operating characteristics and parameters of the devices of this invention can be determined as follows:

1. Bit Stability

In $1\mu \times 1\mu$ bit, the number of molecules is:

$$N = A_B/a_o^2 = (10^{-4})^2/(3.5 \times 10^{-8})^2 \approx 10^7 \text{ molecules/bit}$$

$a_o$ is the intermolecular spacing (~ 3.5A) and $A_B$ the bit area. The number of molecules in a bit that decay from state 1 to state 2 is obtained from:

$$\dot{n}_1 = -n_1\lambda + n_2\lambda$$
$$N = n_1 + n_2 \qquad (1)$$

yielding $$n_1 = N/2\ (e^{-2\lambda t} + 1)$$

where λ = decay rate constant, $n_1$ = No. of molecules in state 1 and $n_2$ = No. molecules in state 2

If it is assumed that a bit is lost when 20 percent of the molecules have decayed to state 2 and the probability is that a bit is lost after 1 day, neglecting the possibility of parity checks and error correcting codes, then $n_1/N = 0.8$ and $t = 86{,}400$.

$$\lambda \approx 3 \times 10^{-6}$$

the total memory need not be considered since the narrowness of the distribution is $\sqrt{N} \mid \sim 3 \times 10^3$ and 20 percent decay is of interest, i.e., ~ $10^6$ so that all the bits fail at approximately the same time. Since the fall off the probability for failure falls of exponentially in the tail of the distribution, very large memories are required before the exponential tails become important, i.e., > $10^{12}$ bits.

Now $\lambda = \omega P$ where ω is the frequency of the electron and *P* the probability of tunneling. For the molecules of interest the ground state electron energies $E_0$ are of the order of 0.1 ev so that $\omega = 1.5 \times 10^{14}$ and $P = 1.5 \times 10^{-20}$. For the electron energy *E* less than the potential barrier *V*, $$P = 4E(V-E)/4E(V-E) + V^2 \sinh^2 4\pi\sqrt{2M}\,|/h \; L\sqrt{V-E}\,|$$

$L$ is the length of the barrier. To get a $P$ of the order of $10^{-20}$ (for $E=E_0$) requires $|\overline{V-E_0}|L \approx 45$ $V$ and $E_0$ in ev and $L$ in A.

To some extent there is a trade-off between voltage and length. For example, for $V=0.2$v, $L \approx 142$ A and for $V=1.6$v, $L \approx 37$ A. There are limits to this trade-off for a number of reasons. One, there is a limit to how high one can make $V$ in practical molecules and secondly, one would not want to have $V$ large and $L$ small because the electric field needed to switch the memory would be so high the material would break down. Thirdly, we would not want $V$ too small since then it would become of the same order as thermal energies (0.025 $ev$) and the memory would not be stable unless cooled to low temperatures (i.e., $kT << V-E_0$). Fourthly, the smaller $V$ the larger $L$ which in many cases would make the molecule more difficult to fabricate.

Further the calculation of $P$ is obtained from a free electron approximation and is an upper bound to the tunneling rate in an actual device since the molecules being considered have localized electrons. The exact value of L would depend on the particular molecules used. A convenient range however would be $0.2 \leq V \leq 1.5$ and $4 \leq L \leq 100$ For the molecules whose potential energy diagram is represented by FIG. 4, a similar calculation will establish a relation for wells $a$ and $b$ and therefore a value for $m$.

2. Switching Voltages

In order to switch a bit, a voltage $V_s$ is applied across the bit which adds to $E$ thereby reducing the energy barrier $V-E-V_s$ which impedes the motion of the electron. There is obtained $$\dot{n}_1 = -n_1\lambda$$

$$n_1 = Ne^{-t}$$

In this case, the second term which was included in Eq. (1) hereinabove is neglected since with a voltage applied, the barrier will be $V-E+V_s$ so that the back tunneling from well 2 to well 1 is unimportant.

If there is defined $n_1 = 0.01N$ as switching the bit, then $$\lambda t = 4.6$$

or $$P = t/\omega = 4.6/t\omega = 4.6 \times 60^{-15}/t$$

for $t$ the order of a picosecond $P \approx 10^{-3}$ which may be obtained if $V_s \approx V$ Choosing a material with $V=0.5$ volts, for example $L \approx 64$ Å so that field for seitching ($E_S$) is $$E_s = V_s/L = 0.5/64 \times 10^{-8} = 7.8 \times 10^5 \text{ v/cm}$$

an easily obtainable value for thin films.

3. Read Current $$i = dq/dt$$

$$dq = 2eN \sim 3 \times 10^{-12} \text{ coulombs}$$

The intrinsic maximum switching speed of the molecule occurs $\sim 1/\omega \sim 10^{15}$ sec. ($P \approx 1$) so the switching of the device will depend on external circuit consideration.

Assume $10^{-9}$ sec.

$$i = dq/dt = 3 \times 10^{-3}$$

This current into a 10 Ω load (typical sense circuit) gives $V_o \approx 30$ $ma$. The current will actually increase as the external circuitry responds faster until the switching speed $\sim 1/\omega$ is reached.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An organic memory device comprising:

a film of an organic compound having a molecular structure which includes a mixed valence double well of a redox couple separated by a non-conjugated bridge, the two components of the redox couple being the respective end groups of the molecular structure, the remainder of the molecular structure being chosen to effect electro-neutrality, the total molecular structure being of a nature such that, in a film of the compound laid down on a substrate surface, the molecules thereof assume dispositions whereby their respective axes are substantially perpendicular to the plane of said surface, said compound being characterized by a potential energy versus distance plot, wherein the term distance signifies substantially the length of molecule, which defines first and second minimum potentials separated by a maximum potential;

first and second conductor means orthogonally disposed relative to each other sandwiching said film therebetween; and means for applying a potential to said conductors to cause electron tunneling from one to the other of said minimum potentials.

2. An organic memory device as defined in claim 1 wherein the molecular structure of said compound is chosen such that a valence interchange occurs between said components of said redox couple during said tunneling and such that tautomerism is provided for the maintenance of said electro-neutrality during and after said valence interchange.

3. An organic memory device as defined in claim 1 wherein:

each of said conductor means comprises a plurality of conductor pairs and wherein;

said potential applying means includes means for energizing select pairs of conductors.

4. An organic memory device as defined in claim 2 wherein said organic compound is selected from the group consisting of

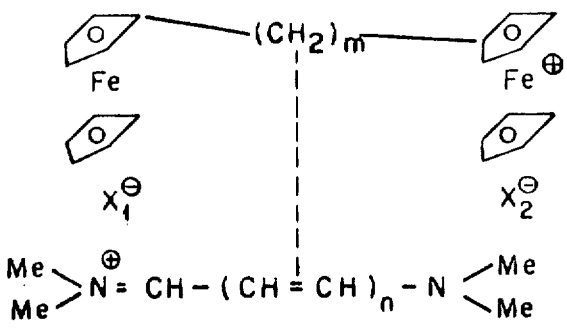
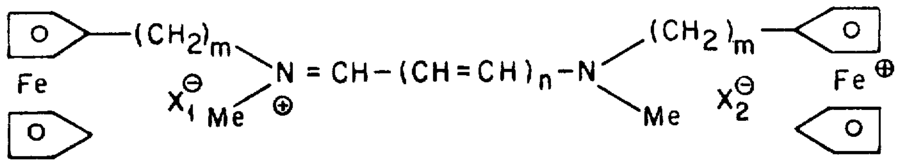
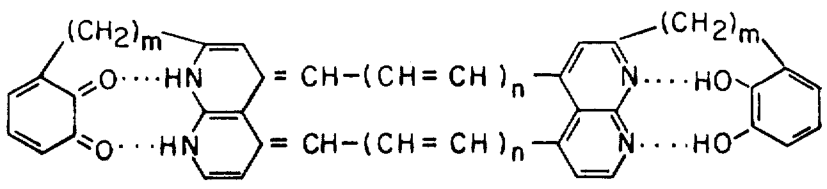
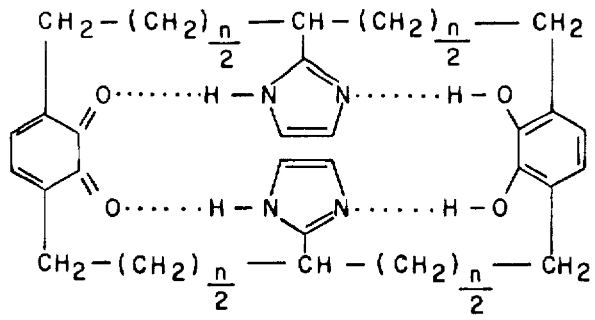
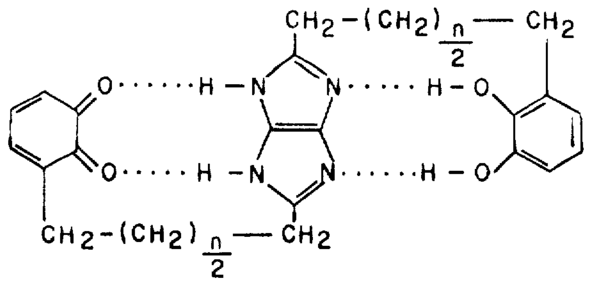
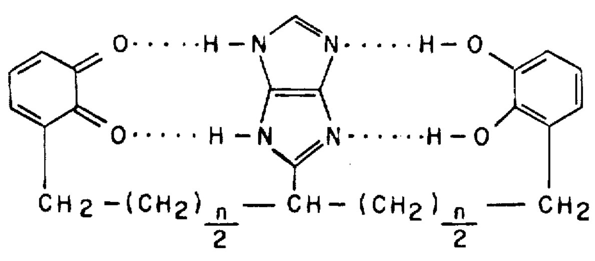
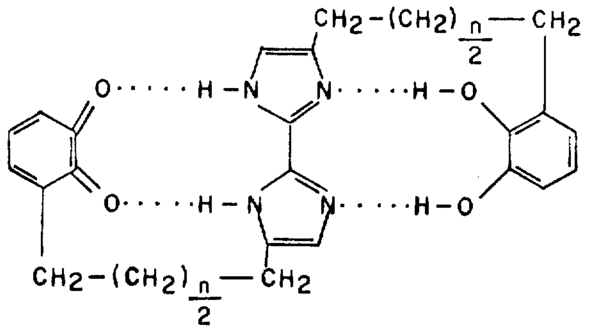

Claim 4 Cont'd
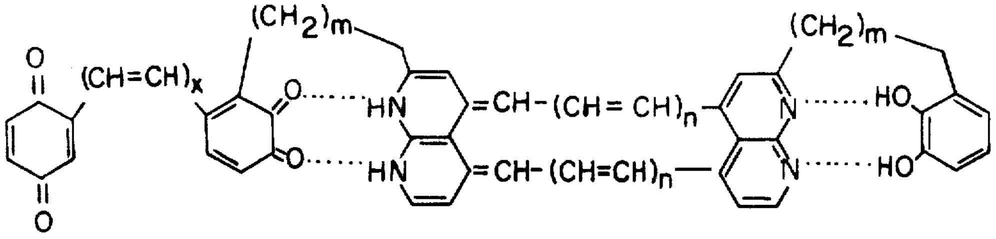
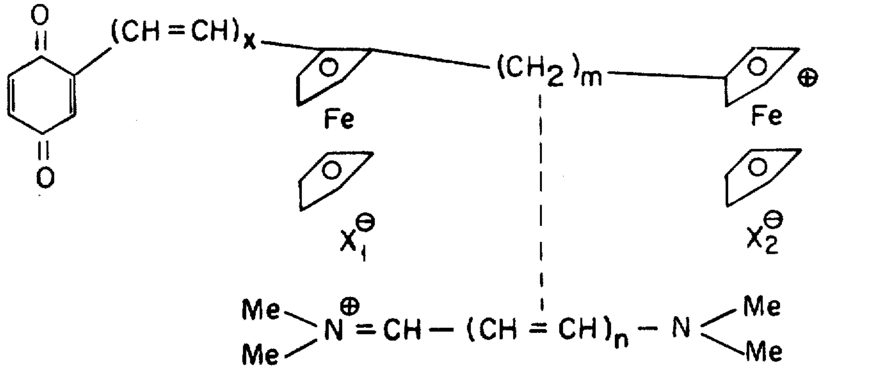
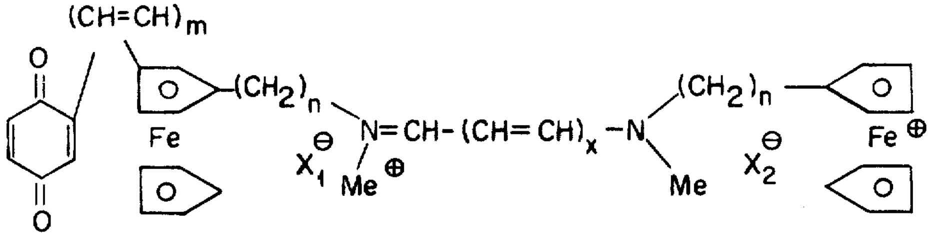
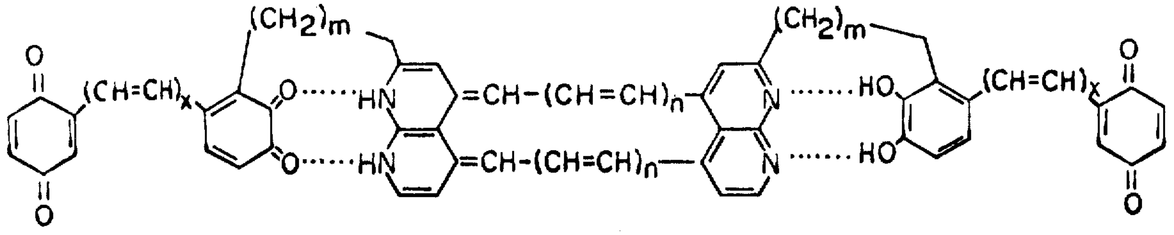
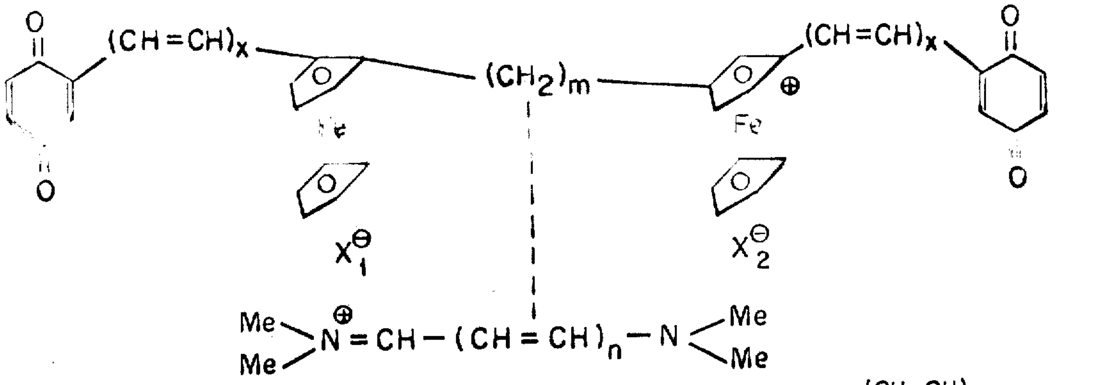
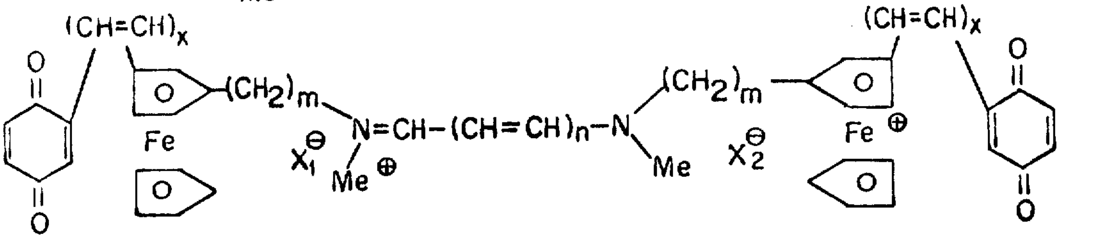

wherein $X_1^{\ominus}$ and $X_2^{\ominus}$ are simple anions, $x$ has a value of from 1 to 3, in those compounds wherein both $m$ and $n$ occur, $m$ has a value of from 2 to 50 and $n$ has a value of from 1 to 25, and in those compounds where only $n$ occurs, $n$ has a value of from 2 to 30.

5. An organic memory device as defined in claim 4 wherein $X_1^{\ominus}$ and $X_2^{\ominus}$ are selected from the group consisting of $I^{\ominus}$, $Br^{\ominus}$, $Cl^{\ominus}$, $F^{\ominus}$, $AcO^{\ominus}$, $BF_4^{\ominus}$, and $TCNQ^{\ominus}$.

6. An organic memory device as defined in claim 2 wherein said organic compound has the structure

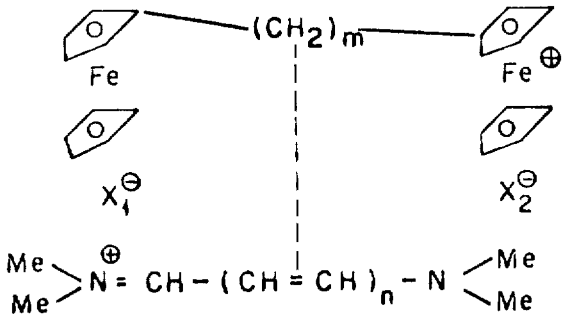

wherein $X_1^{\ominus}$ and $X_2^{\ominus}$ are anions selected from the group consisting of $I^{\ominus}$, $Br^{\ominus}$, $Cl^{\ominus}$, $F^{\ominus}$, $AcO^{\ominus}$, $BF_4^{\ominus}$, and TCNQ, wherein $m$ has a value of 2 to 50 and $n$ has a value of 1 to 25.

7. An organic memory device as defined in claim 2 wherein said organic compound has the structure

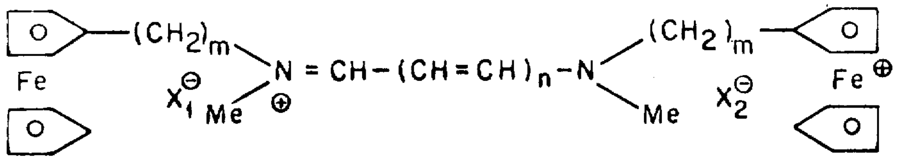

wherein $X_1^{\ominus}$ and $X_2^{\ominus}$ are anions selected from the group consisting of $I^{\ominus}$, $Br^{\ominus}$, $Cl^{\ominus}$, $F^{\ominus}$, $AcO^{\ominus}$, $BF_4^{\ominus}$, and $TCNQ^{\ominus}$, wherein $m$ has a value of 2 to 50 and $n$ has a value of 1 to 25.

8. An organic memory device as defined in claim 2 wherein said organic compound has the structure

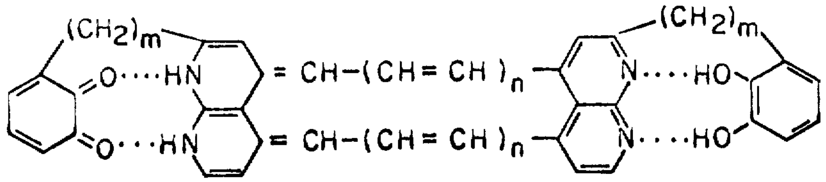

wherein $m$ has a value of 2 to 50 and $n$ has a value of 1 to 25.

9. An organic memory device as defined in claim 2 wherein said organic compound has the structure

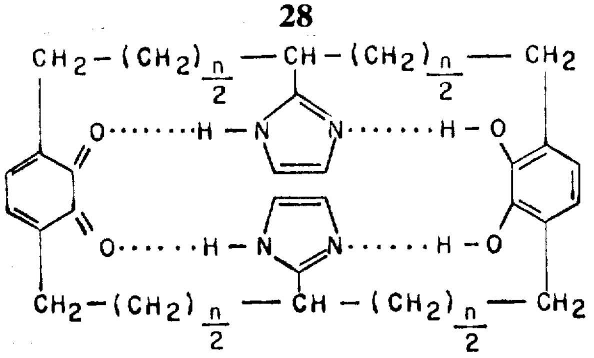

wherein $n$ has a value of 2 to 30.

10. An organic memory device as defined in claim 2 wherein said organic compound has the structure

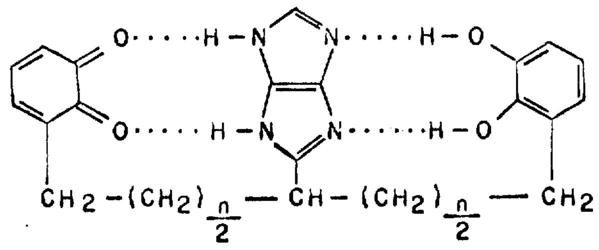

wherein $n$ has a value of 2 to 30.

11. An organic memory device as defined in claim 3 wherein one of said conductors is transparent.

12. An organic memory device as defined in claim 11 and further including a laser source for applying energy to said film to raise electrons in said film through their maximum potential.

13. An organic memory device as defined in claim 12 wherein said device is caused to have non-destructive readout by providing as the film therein, an organic compound selected from the group consisting of

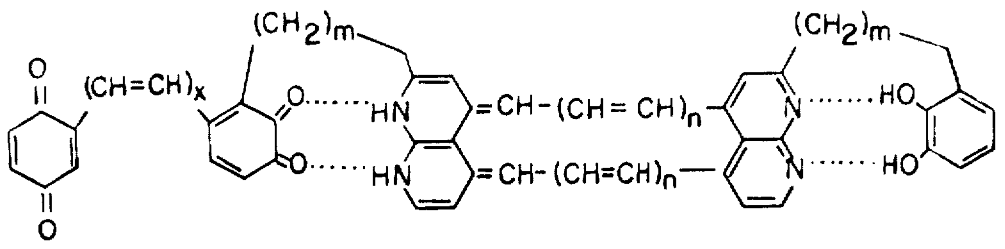

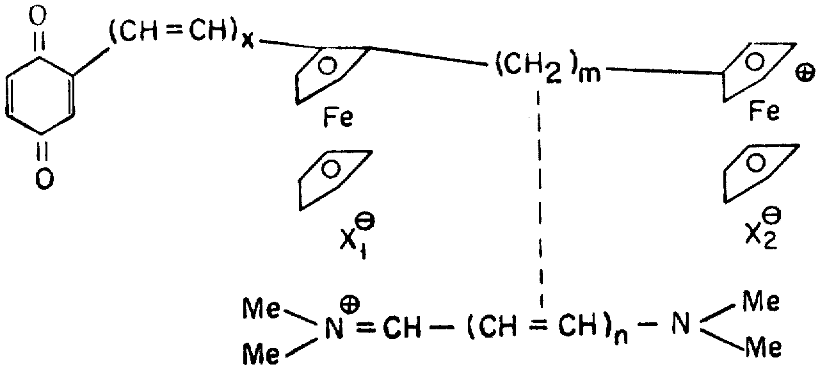
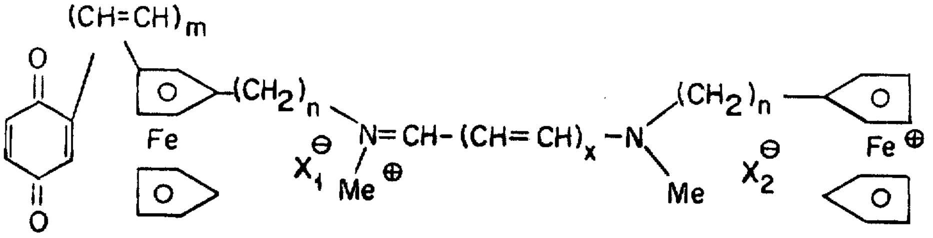
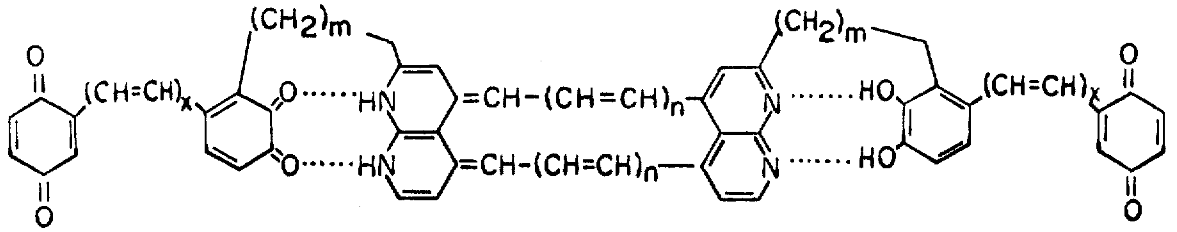
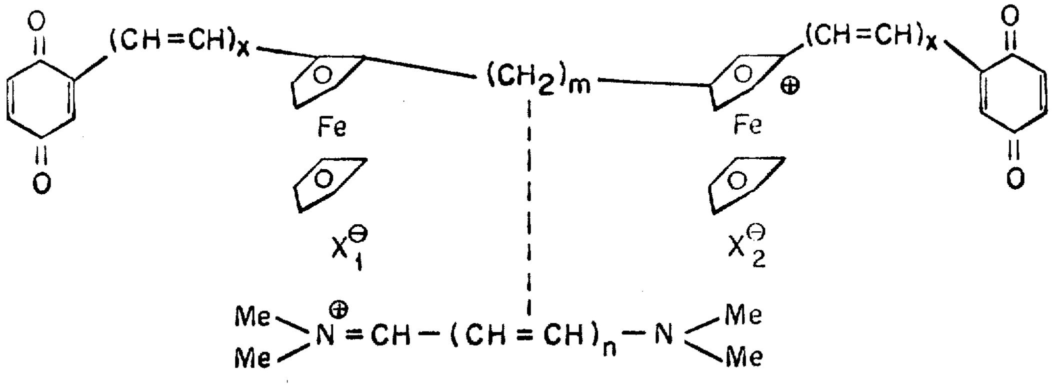
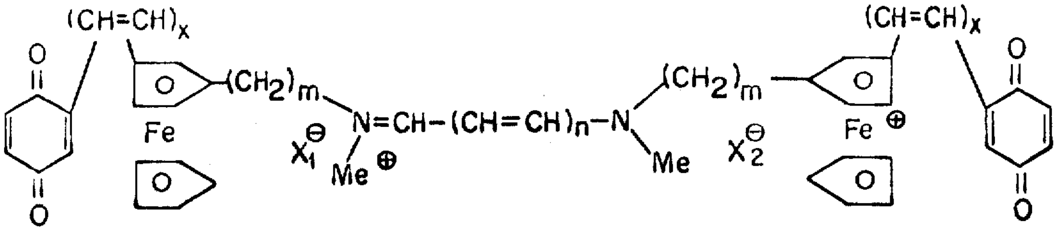

wherein $X_1^{\ominus}$ and $X_2^{\ominus}$ are simple anions, $x$ has a value of from 1 to 3, $m$, has a value of from 2 to 50, and $n$ has a value of from 1 to 25.

14. An organic memory device as defined in claim 12 wherein said device is caused to have non-destructive readout by providing as the film therein, an organic compound which exhibits the potential energy versus distance plot as shown in FIG. 4, said compound being selected from the group consisting of wherein $X_1^{\ominus}$ and $X_2^{\ominus}$ are simple anions, $x$ has a value of from 1 to 3, $m$ has a value of from 2 to 50, and $n$ has a value of from 1 to 25.

15. An organic memory device as defined in claim 11 wherein said device is caused to have non-destructive readout by providing a film of an organic compound which exhibits the potential energy versus distance plot shown in FIG. 8, said compound being selected from the group consisting of

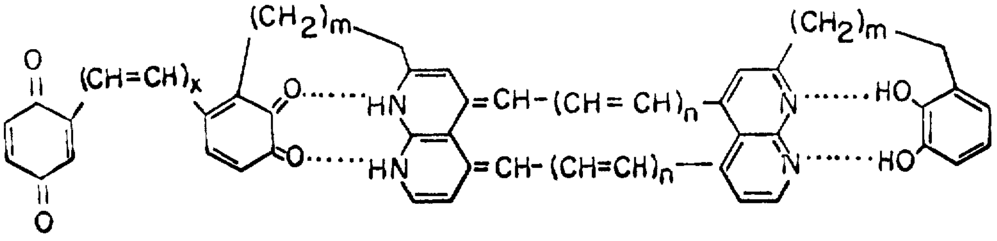

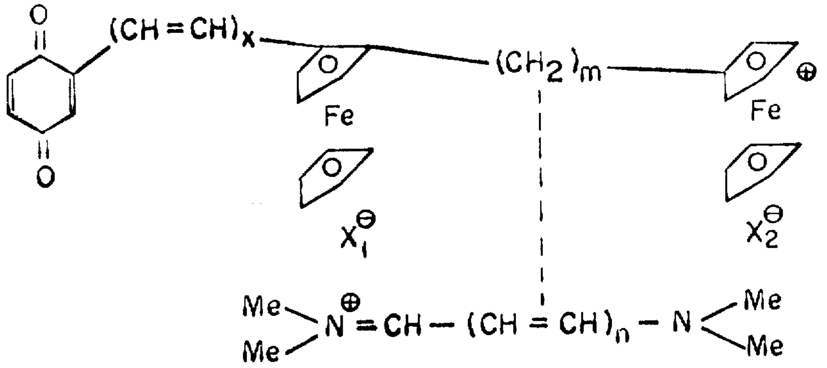

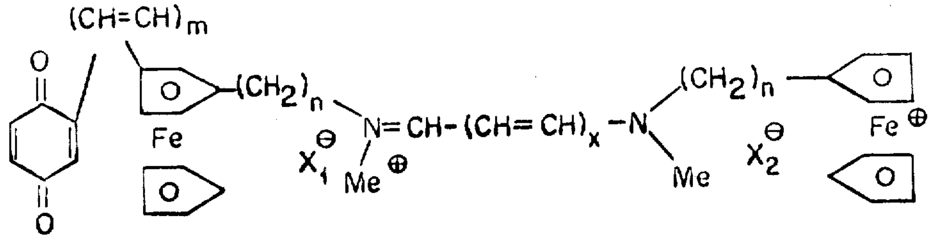

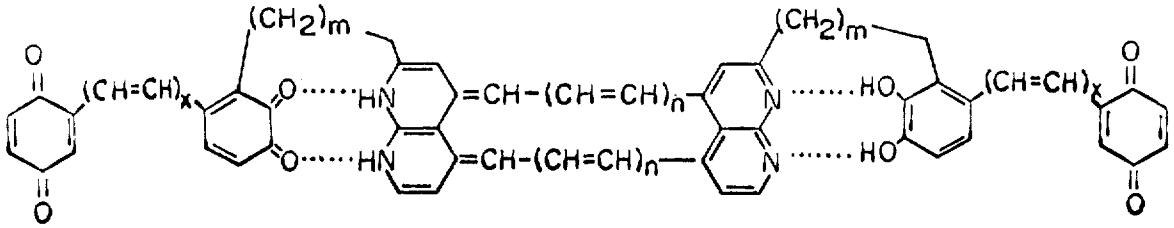

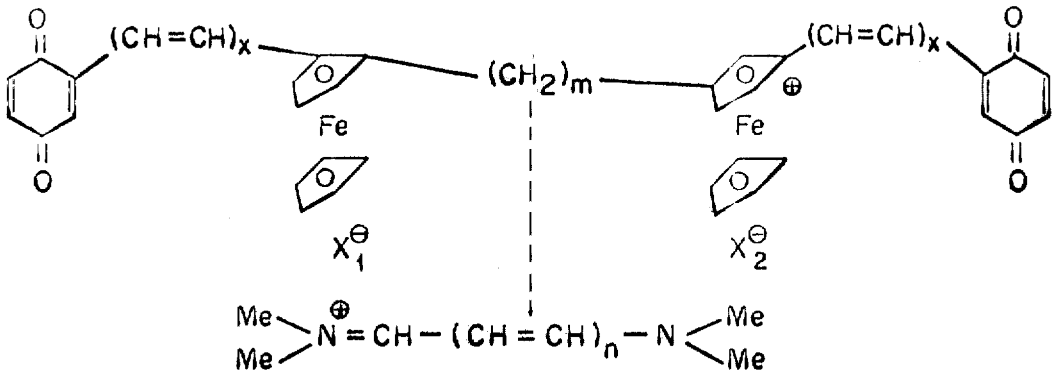

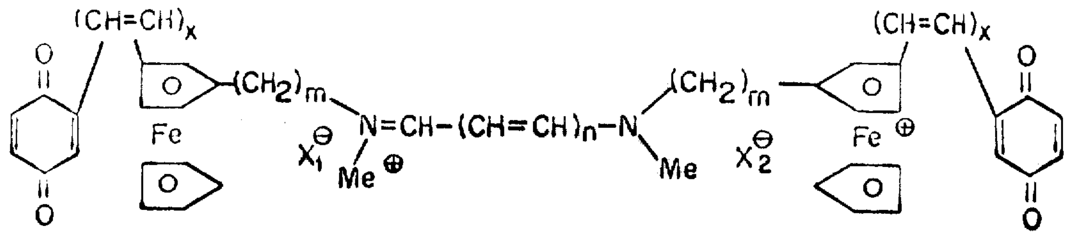

wherein $X_1^\ominus$ and $X_2^\ominus$ are simple anions, $x$ has a value of from 1 to 3, $m$ has a value of from 2 to 50, and $n$ has a value of from 1 to 25.

16. An organic memory device comprising:

a film of an organic compound having a molecular structure which includes a mixed valence double wall of a redox couple separated by a non-conjugated bridge, the two components of the redox couple being the respective end groups of the molecular structure, the remainder of the molecular structure being chosen to effect electroneutrality, the total molecular structure being of a nature such that, in a film of the compound laid down on a substrate surface, the molecules thereof assume dispositions whereby their respective axes are substantially perpendicular to the plane of said surface, said compound being characterized by a potential energy versus distance plot, wherein the term distance signifies substantially the length of molecule, which defines first and second minimum potentials separated by a maximum potential, and wherein the molecular structure of said compound is chosen such that a valence interchange occurs between said components of said redox couple during said tunneling and such that tautomerism is provided for the maintenance of said electroneutrality during and after said valence interchange, the distance between said minimum potentials being at least 4 angstroms;

a pair of photoconductive films disposed upon the upper and lower surfaces of said film and contiguous thereto;

a pair of conductors in intimate contact with the upper and lower surfaces of said photoconductive films;

an energy source connected to said conductors for applying a voltage across said photoconductive films; and a light source to decrease the resistivity of said photoconductive film when a voltage is applied thereacross, whereby electron tunneling is effected from one minimum potential to another minimum potential of said organic film.

17. An organic memory device as defined in claim 16 wherein said organic compound is selected from the group consisting of:

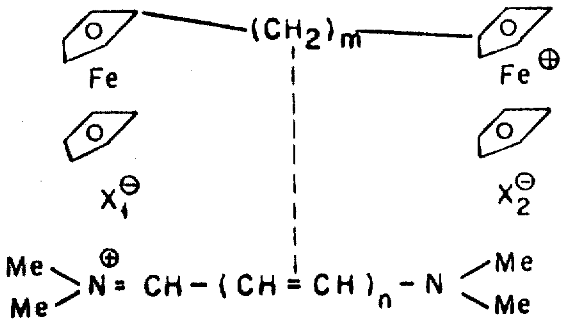

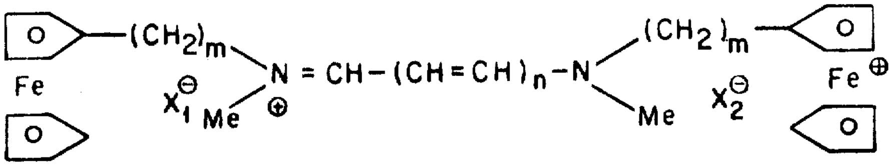

Claim 17 Cont'd
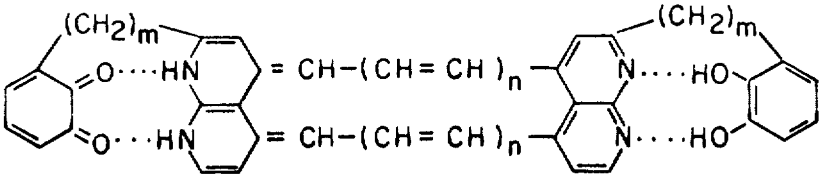
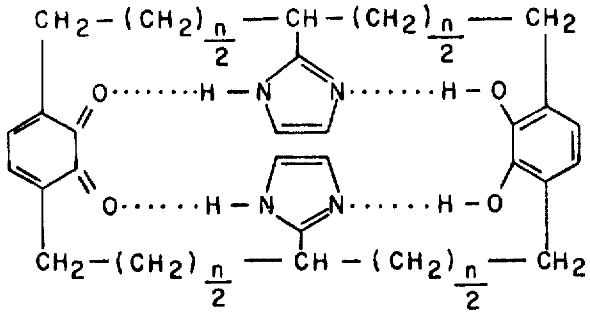
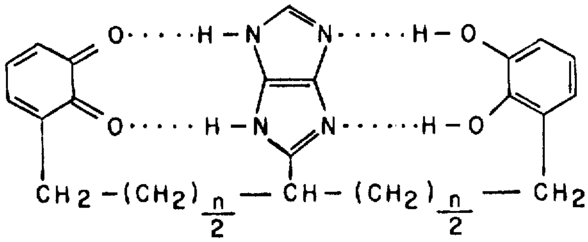
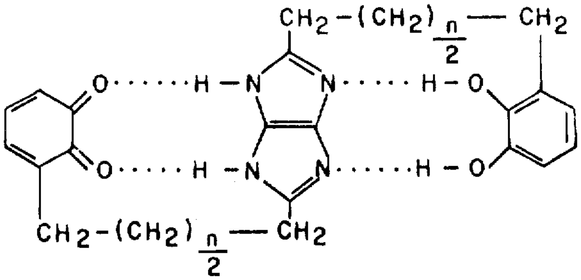
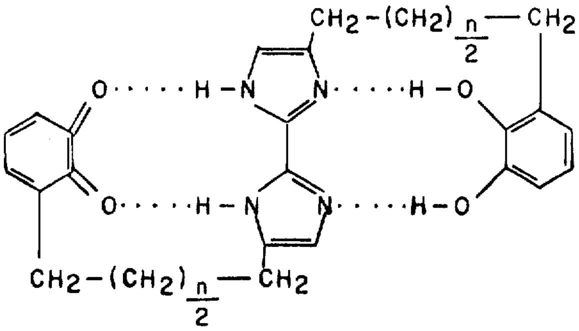

Claim 17 Cont'd
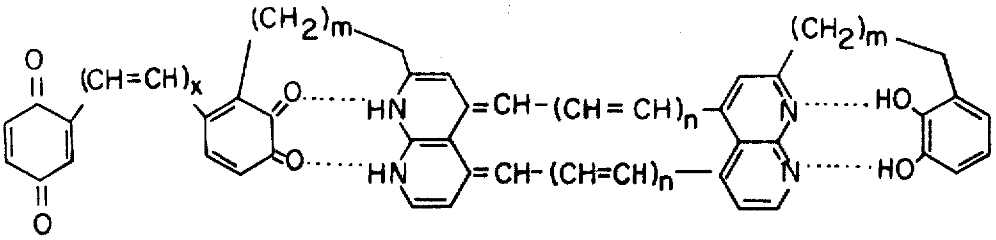
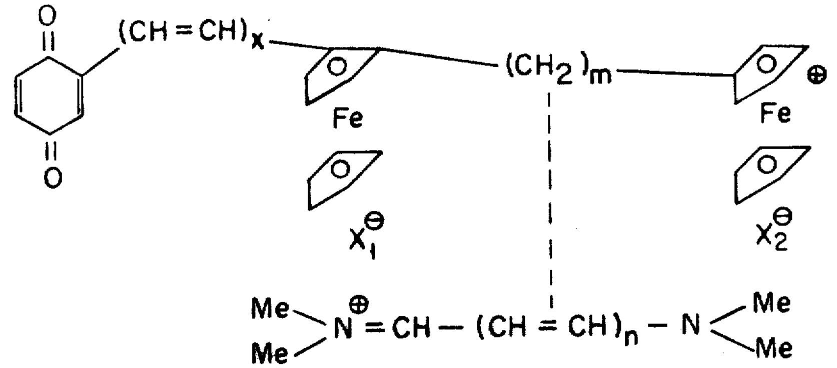
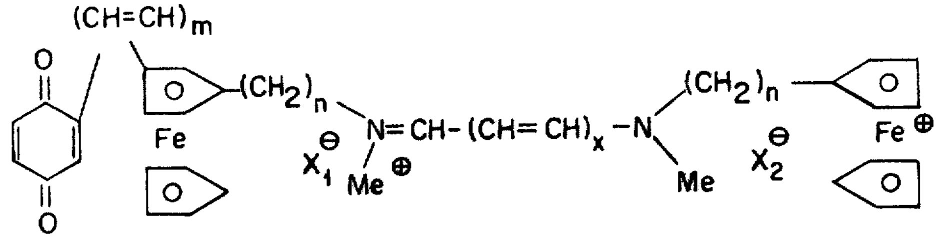
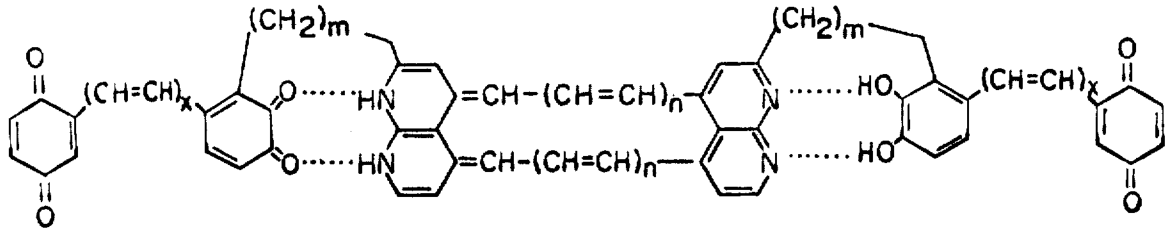
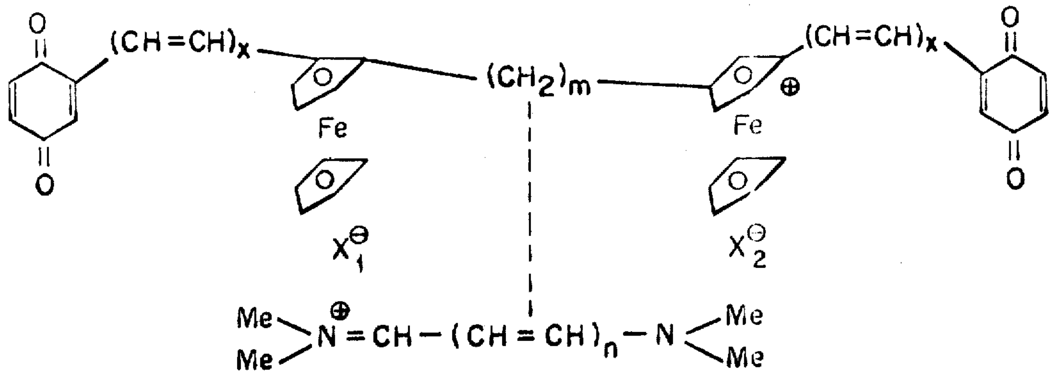
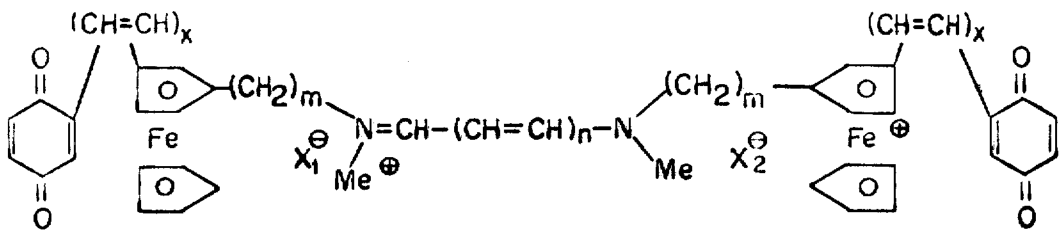

wherein $X_1^{\ominus}$ and $X_2^{\ominus}$ are simple anions, $x$ has a value of from 1 to 3, in those compounds wherein both $m$ and $n$ occur, $m$ has a value of from 2 to 50 and $n$ has a value of from 1 to 25, and in those compounds where only $n$ occurs, $n$ has a value of from 2 to 30.

18. An organic memory device as defined in claim 17 wherein the distance between said minimum potentials is from about 4 to 100 Angstroms.

* * * * *